United States Patent [19]
Arnold et al.

[11] Patent Number: 5,468,091
[45] Date of Patent: Nov. 21, 1995

[54] INSERTING LININGS INTO PIPES

[76] Inventors: Kevin E. Arnold, 1 Mill Flats, Ashton, Oundle, Northamptonshire, PE8 5LB; Keith Baylis, 134 Bellemoor Road, Shirley, Southampton SO1 2RA, both of Great Britain

[21] Appl. No.: 983,550
[22] PCT Filed: Aug. 2, 1991
[86] PCT No.: PCT/GB91/01327
  § 371 Date: Feb. 2, 1993
  § 102(e) Date: Feb. 2, 1993
[87] PCT Pub. No.: WO92/02755
  PCT Pub. Date: Feb. 20, 1992

[30] Foreign Application Priority Data
  Aug. 3, 1990 [GB] United Kingdom .................. 9017081
  Nov. 29, 1990 [GB] United Kingdom .................. 9025990

[51] Int. Cl.$^6$ ............................................. F16L 55/165
[52] U.S. Cl. ............................................. 405/154; 405/157
[58] Field of Search ......................... 405/154, 156, 405/157, 184; 138/97; 156/287, 294

[56] References Cited

U.S. PATENT DOCUMENTS 3,294,121  12/1966  Powell et al. .

FOREIGN PATENT DOCUMENTS

3804674  8/1989  Germany .
2123919  2/1984  United Kingdom .
2227071  7/1990  United Kingdom .

Primary Examiner—David H. Corbin
Attorney, Agent, or Firm—Quarles & Brady

[57] ABSTRACT

A method of lining an old pipe (1) with a plastics liner (20) avoids the need to excavate a hole at the underground connection (2) between the pipe and a main (3). This is achieved by injecting a flowable sealant material into the annular space between the liner (20) and the pipe (1) such that the sealant extends close to the connection (2). To prevent sealant entering the main (3), the advancing sealant is detected when it approaches the connection (2) by a capacitative sensor (81) located within the liner on a flexible elongate carrier (69). The procedure is carried out with gas in the main (3), a removable plug (67) being housed in a terminator (62) for the liner (20), and the plug being subsequently captured by a connector (68) on the carrier (69) and then withdrawn through the liner. The sensor (81) also enables the liner prior to injection of the sealant to be correctly positioned axially of the pipe (1) according to the type of connection (2).

13 Claims, 5 Drawing Sheets

INSERTING LININGS INTO PIPES

BACKGROUND OF THE INVENTION

This invention relates to inserting linings into pipes particularly, but not exclusively, to the insertion of a preformed lining into an underground gas service pipe extending from an underground gas main to a building.

The terms 'lining' and 'liner' are used herein to include any insert which is capable of conveying a fluid within the pipe, and the insert may or may not be a close fit in the pipe.

Gas service pipes were made of steel or copper and they can be subject to corrosion in the ground and then leak. A procedure has been devised and is widely used for lining such gas services with a plastics tube. The procedure involves excavating a hole in the road or pavement to expose the connection between the gas service and the gas main, removing the section of service adjacent to the connection, pushing a length of plastics tube through the remaining length of service, and effecting connections at opposite ends of the plastics tube respectively with the main and with a meter cock.

In order to stop gas, in the event of a fire, spreading along the service by way of the annular space between the external surface of the plastics tube and the internal surface of the old service, that annular space in the end region of the service adjacent to the meter is filled with a predetermined quantity of sealant material, sufficient to fill totally the vertical limb of the service to provide a half-hour fire resistance.

The present invention is aimed at avoiding the need in most cases to excavate a hole to expose the connection between the main and the service. Such holes are costly to produce and fill, and can be very inconvenient to the public.

Whilst the invention is primarily concerned with gas pipes, it might be applied to water pipes or pipes conveying other liquids.

SUMMARY OF THE INVENTION

According to one aspect of the invention, a method of lining a pipe which has an underground connection with a further pipe comprises inserting a tubular liner into the pipe from the free end opposite to the underground connection such that the liner extends adjacent to or through the connection, and effecting a seal with a sealing means between the liner and the pipe or, possibly, between the liner and the connection, so as to close-off the annular space defined between the liner and the pipe in the region adjacent to said connection, the sealing means being introduced into the pipe from the pipe end remote from the connection.

Thus, the liner can completely bypass any corroded portions of the pipe, and fluid cannot enter the annular space from the further pipe. Providing that an effective seal is made between the liner and the pipe in the region adjacent the connection, there is no need to expose the connection by excavating in the road or footpath.

The seal is preferably effected by a sealant which is inserted in a flowable condition into the annular space from adjacent the free end of the pipe, following insertion of the liner into the pipe.

It is important that substantially no sealant material enters the further pipe because the further pipe will usually be a main which supplies similar such pipes, and a partial or complete blockage of the main should be avoided.

Preferably sealant detection means is provided to detect when the sealant closely reaches the connection, to enable the injection of sealant into the annular space to be terminated.

The sealant detection means may comprise an electrical sensor means which is arranged in the liner adjacent the connection and produces an electrical signal when the sealant reaches or closely approaches the sensor means.

The electrical sensor means may be an electromagnetic or inductive type but it is preferably a capacitative sensor. Conveniently, one electrode of the capacitative sensor is provided by the metal pipe being lined, and the other electrode by an insert which is arranged to be temporarily located within the liner, at a location spaced along the pipe by a predetermined amount from the underground end thereof.

The insert is preferably carried by a flexible elongate carrier which is inserted into the liner, and is withdrawn from the liner after insertion of the sealant.

A second aspect of the invention is concerned with a method of inserting a liner to a desired position in the pipe.

According to the second aspect of the invention, a method of lining a pipe which has an underground connection with a further pipe comprises inserting into the pipe from the free end opposite to the underground connection a length of flexible rod until the underground end of the rod is arrested by engagement with the further pipe or with said connection, recording directly or indirectly the inserted length of rod, and inserting a length of liner into the pipe from the free end, the length of the liner inserted being chosen by reference to the recorded inserted length of rod such that the liner will not protrude substantially into the further pipe.

The method of inserting the liner into the gas service from the free end opposite to the underground connection with the gas main preferably comprises attaching to said free end of the service a valve having a bore which is capable of accepting the liner, and providing outwardly of said valve an annular seal means adapted to effect a seal with the outer surface of the liner when the liner is passed through the seal, and inserting the liner into the free end through said annular seal means with said valve closed, then opening the valve and urging the liner through the open valve.

Such a liner insertion method is described in Specification No. GB 2,227,071A of British Gas plc.

The valve is used to close the free end of the service prior to insertion of the liner, whereupon the seal will seal the annular space between the service and the liner. Providing that the outer end of the liner is suitably plugged prior to insertion of the liner into the service, there will be little escape of gas during the overall insertion procedure.

Preferably a connector in the form of a service head adaptor is interposed between the free end of the service and said valve, the connector being provided with an injection port arranged to communicate with the annular gap between the service and the inserted liner, the injection port being suitable for injecting sealant material into the annular gap.

Said valve and said annular seal means are preferably replaced by a further valve, conveniently a meter control cock. This replacement step is taken prior to injection of sealant material into the injection port of the service head adaptor.

The service head adaptor is preferably provided with interchangeable, tubular, upper end portions, a first of the upper end portions being adapted to permit the liner to be pushed through the first upper end portion, whereas the second upper end portion, which is secured to the main part of the service head adaptor after the outer end of the liner has been cut to length, is adapted to seal with the end of the liner.

Such connectors are already used in the previously mentioned existing method for injecting sealant into the annular space. The connector is adapted to be secured at its lower end to the free end of the gas service, usually to replace the old meter cock, and its upper end incorporates an annular seal positioned above the injection port and adapted to seal with the external surface of the liner, thereby to terminate said annular gap.

According to a third aspect of the invention, a method of coating the internal surface of an underground service pipe comprises inserting a tube into the pipe from the above-ground end of the pipe, and then withdrawing the tube gradually whilst a sealant is being injected into the pipe through the tube, the sealant being in the form of a high wicking action anaerobic liquid.

The third aspect of the invention can be used to provide an emergency repair to a leaking service pipe, or it can be applied to improve the resistance of a service pipe to corrosion. The third aspect may be used in conjunction with the first aspect of the invention, to apply a seal ant to the internal surface of the service pipe prior to introduction of said sealing means into said annular space.

According to a fourth aspect of the present invention a termination assembly for a liner comprises a tubular terminator comprising a generally streamlined portion adapted to abut with that end of the liner which is inserted into a pipe to be lined, and a spigot portion adapted to be a firm fit within that end of the liner, the streamlined portion substantially covering the cut extremity of that end of the liner, and a plug which is adapted to seal the bore of the terminator and to be retractable from the terminator through the bore of the liner.

Such a termination assembly enables a plastics liner to be live-inserted into a gas service with a reduced risk of the extremity of the liner snagging on any steps in the gas service, and the shape of the terminator helps to displace sideways any debris in the service to enable the liner to pass the debris.

By 'streamlined' we mean generally sloping, rounded, or faired, as opposed to a strict definition associated with fluid flow theory.

The plug is located in place in the terminator during insertion of the liner, and thereby prevents gas flowing into the bore of the liner until the plug is subsequently retracted.

The plug can be withdrawn from the terminator by an elongate flexible means which preferably carries a sealant detection means.

Thus, when the seal ant detection means comprises a capacitor electrode, said capacitor electrode is preferably mounted on said elongate flexible means adjacent to the connection between said flexible means and the plug.

Preferably said capacitor electrode extends axially adjacent to the spigot of the tubular terminator but preferably not within the spigot, and the terminator is of an electrically conductive material. This has the effect of increasing the sensitivity of the capacitative sensor means to the flow of sealant along the pipe as the sealant closely approaches the terminator.

The use of a conductive tubular member within the end of a service in conjunction with a capacitance electrode extending axially adjacent thereto constitutes a further aspect of the invention.

The elongate flexible means preferably has a snap-engagement with the plug to enable the flexible means to be inserted into the liner to retrieve the plug when it is desired to remove the plug.

Other aspects of the invention comprise a gas service fitted with a liner utilising any one of the methods in accordance with the first, second or third aspects of the invention, and a method of inserting a liner into a pipe when the liner is fitted with a termination assembly in accordance with the fourth aspect of the invention.

BRIEF DESCRIPTION OF THE DRAWINGS

The invention will now be further described, by way of example only, with reference to the accompanying drawings, in which.

DETAILED DESCRIPTION OF THE DRAWINGS

Figure 1:
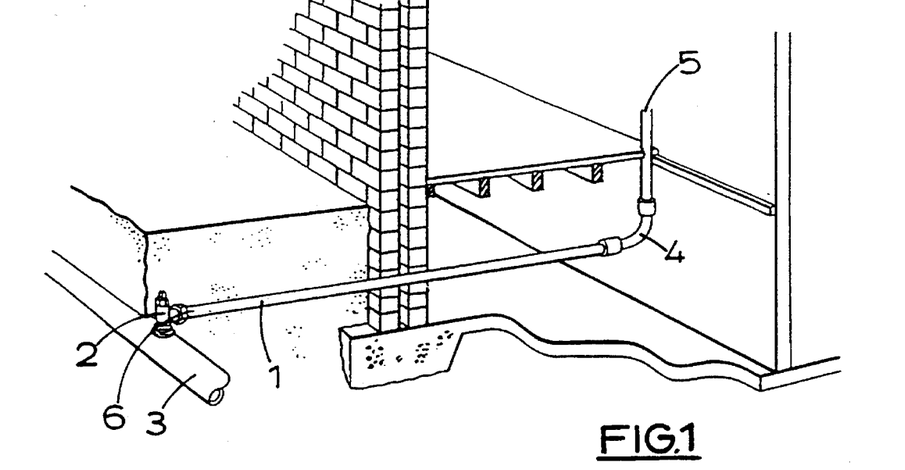
FIG. 1 is a vertical section through a house and neighboring ground showing the usual arrangement of a gas service.

FIG. 1 shows the usual arrangement of steel gas service 1 connecting at 2 with a gas main 3, the service 1 incorporating bends, such as 4, rather than elbows. It is possible to line such a metal service by pushing through it a plastics pipe, typically of 20 mm external diameter and of thickness 2.22 mm. Other diameters, such as 16, 25, 32, 40, 63, 90 mm, can be used. Conventionally it would be necessary to dig a hole to expose the connection 2. By the inventive process the plastics pipe is pushed through the service from the meter cock end 5, hereinafter referred to as the 'free end' of the service, until it reaches that end 6 connected to the main, hereinafter referred to as the 'connected end' of the service.

Figure 2:
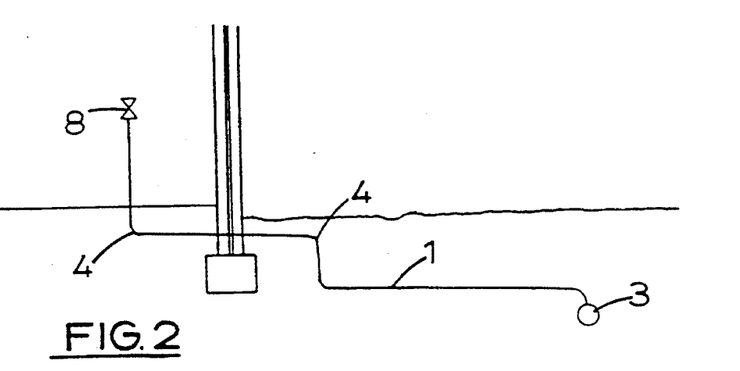
FIG. 2 is a section similar to FIG. 1 but showing another, common arrangement of gas service which incorporates 90° elbows.
Figure 7:
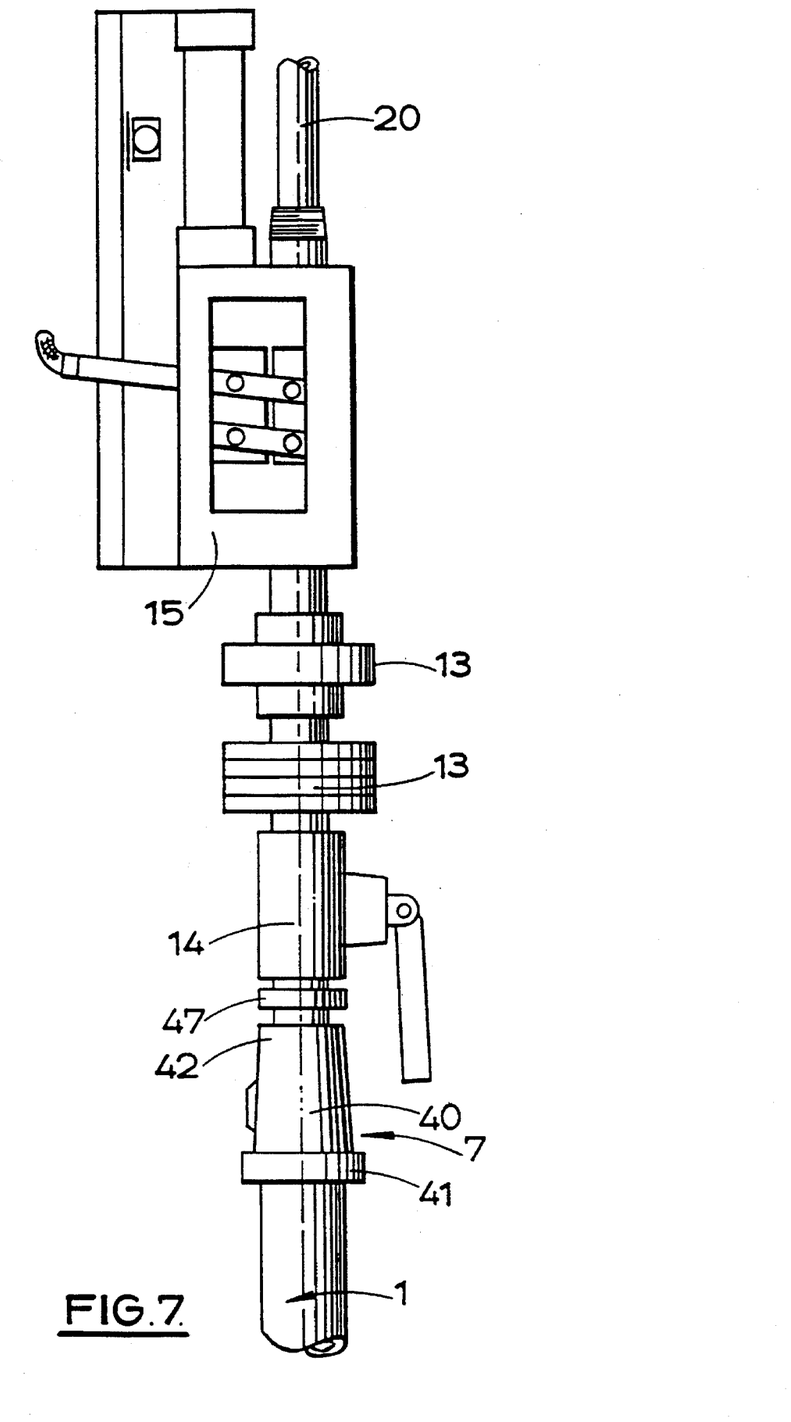
FIG. 7 shows schematically the various components assembled on the free end of the existing gas service during insertion of the liner.

The various stages of a lining procedure in accordance with the invention will now be set out in sequence:

The existing meter cock 8, FIG. 2, is disconnected. A gland similar to gland 13 of FIG. 7, is screwed onto the service in place of the meter cock 8. A flexible rod assembly is inserted and pushed manually through the gland, which is adapted to seal with the rod, and the rod assembly inserted until it stops upon reaching the main 3. This procedure tests whether or not a pipe can be inserted and also gives an approximate measurement of the total length of service.

Figure 3:
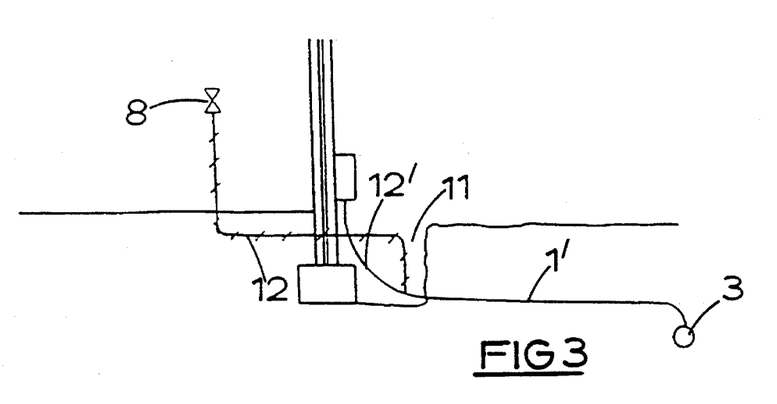
FIG. 3 is a section showing how the service of FIG. 2 is diverted during lining of the service in accordance with the invention.

Adhesive tape is attached to the rod assembly to mark this position. (If it is not possible to negotiate the service, as in the arrangement of FIG. 2 where elbows 4 are used, then a hole 11 is dug adjacent the building and part 12 of the service is abandoned. The remaining length $1^1$, FIG. 3 is lined as far as the service 1 of FIG. 1, and the new length $12^1$ is laid in a conventional manner.)

The rod is then removed and a tube, not shown, of corresponding external diameter to that of the rod is inserted into the pipe 1 through the gland unit, until the tube enters the main. The tube is progressively withdrawn from the pipe 1 whilst a low viscosity, high wicking action anaerobic liquid, such as methacrylate, is fed into the tube either as a spray or by pouring the liquid into the tube.

The anaerobic liquid can permanently seal a leaking service by coating the inside of service 1 with a sealant. This can be particularly important at the connection between the service 1 and the gas main 3. The coating may also be used to inhibit corrosion and thereby reduce the chances of a future leakage. This technique might also be used to provide an emergency repair of a leaking service prior to relaying of the service at a later date.

Using a meter cock exchange tool the meter cock 8 is removed. Those acquainted with the art are conversant with this process.

Figures 5, 6:
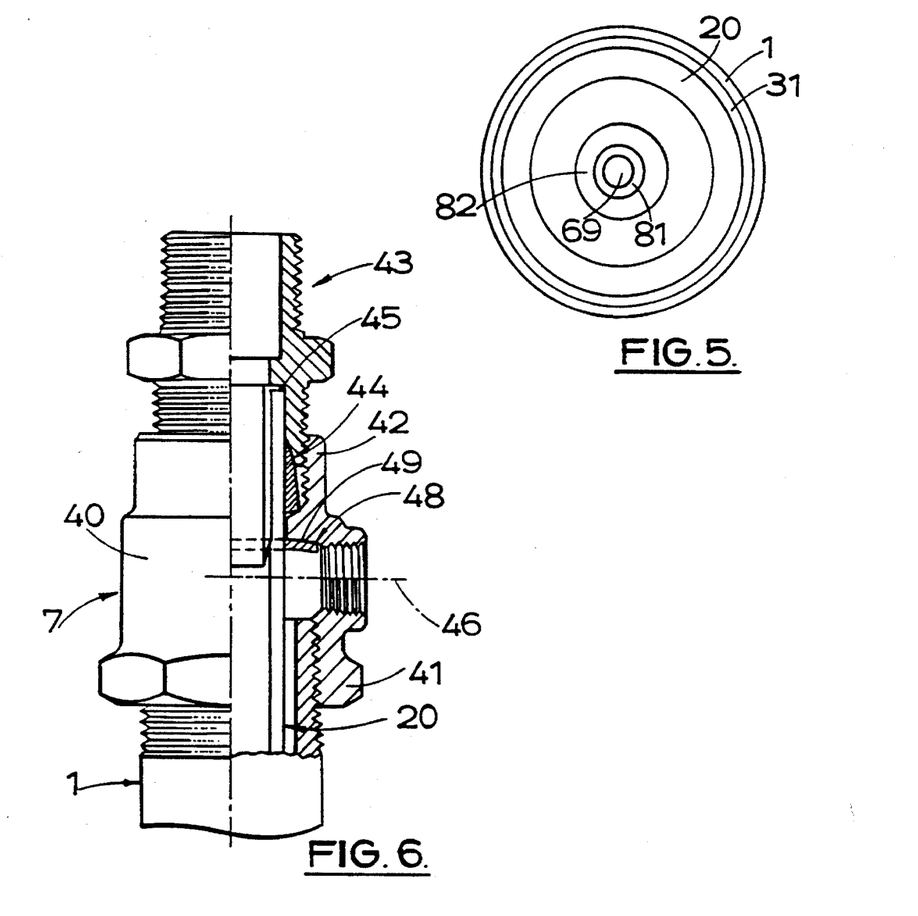
FIG. 5 is a section on the line 5—5 of FIG. 4 but showing the liner in position in a service.
FIG. 6 shows schematically the service head adaptor secured in position on the free end of the existing gas service, with the liner in position and cut to length, and showing the second upper end portion of the service head adaptor secured in position in readiness for sealant injection.
Figure 8:
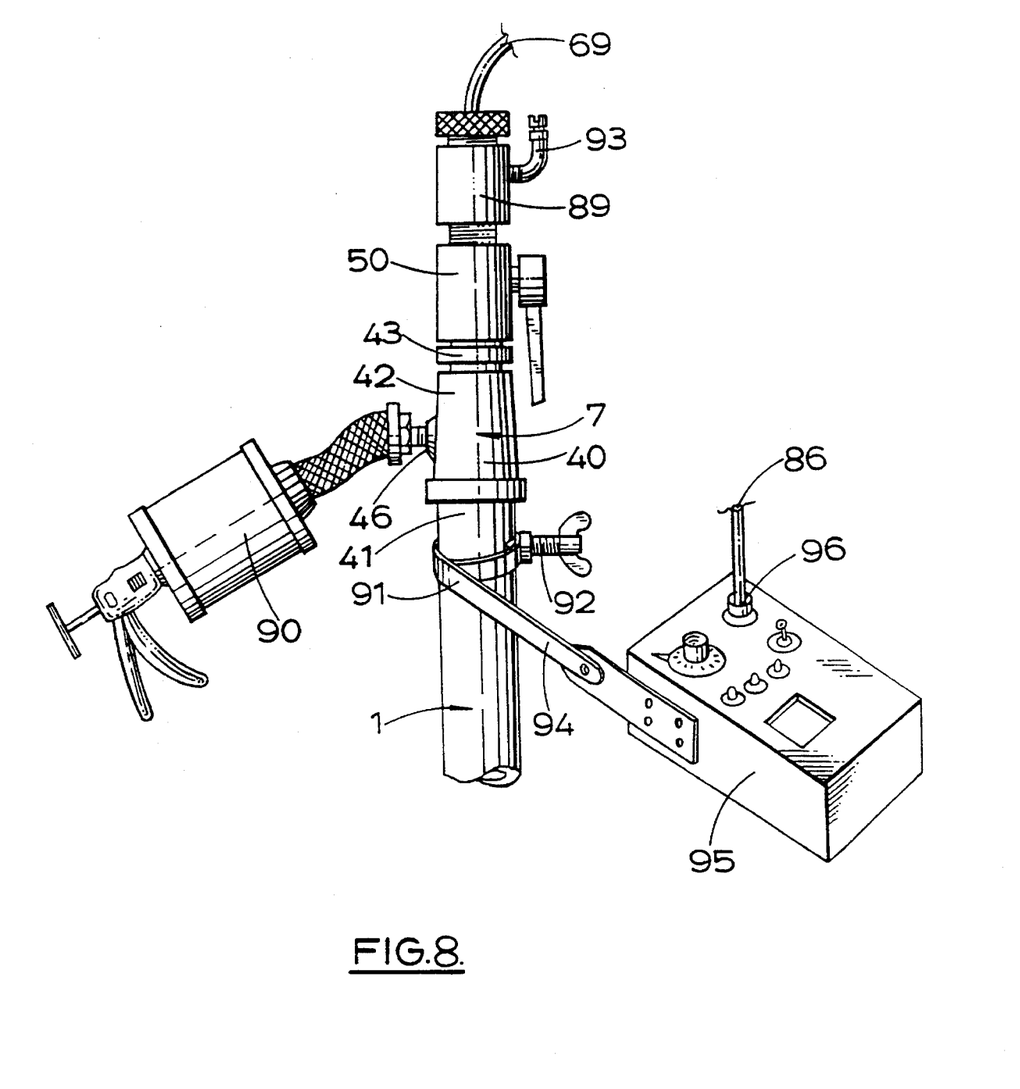
FIG. 8 shows that assembly of components which is subsequently mounted on the gas service for insertion of the sealant material.

A modified service head adaptor 7, FIG. 6, is then attached, as shown in FIG. 8. The service head adaptor comprises a lower body portion 40 adapted to be secured at its lower end 41 to the existing service pipe 1, and at its upper end 42 to be secured to alternative first and second service head adaptor upper end portions 47, 43 respectively. The second upper end portion 43, as shown in FIG. 6, is adapted to be threadedly secured to the body 40 and to clamp a copper sealing ring 42 against a plastics liner 20 adjacent to the cut outer extremity 45 thereof, whereas the (alternative) first upper end portion, indicated at 47 in FIG. 7, is similar to second end portion 43, but differs from end portion 43 in that the internal bore of the first end portion is sized to permit the liner 20 to extend therethrough.

The body 7 is provided with a radial injection port 46. A rubber sealing ring 48, FIG. 6, is secured in body 7 by adhesive or by a star washer against a shoulder 49 above port 46 and is adapted to seal with the outer surface of liner 20 when the liner is in position in the body 7.

The service head adaptor shown in FIG. 6 is a modification of the 'KONTITE' (TM) fitting manufactured by Kay & Co (Engineers) Ltd of Bolton, Lancashire.

FIG. 7 shows the assembly of components which is mounted on the free end 5 of the existing service 1 to enable the plastics liner 20 to be inserted into the service with a minimum release of gas. As shown, a full bore valve 14 with integral gland unit 13 is mounted on top of the first upper end portion 47.

A pushing machine 15 is then attached. Meanwhile outside the property a piece of plastics liner 20 is measured to about 1 meter longer than that length of the rod assembly 9 between the free end of the rod end unit 17 and tape marker and is cut.

The additional length of 1 meter is to provide a sufficient length of liner to be engaged by the pushing machine, even when the liner 20 has reached the fully installed position.

Before proceeding to describe the insertion of the liner 20, it is necessary to digress to describe the termination assembly and capacitance sensor.

Figure 4:
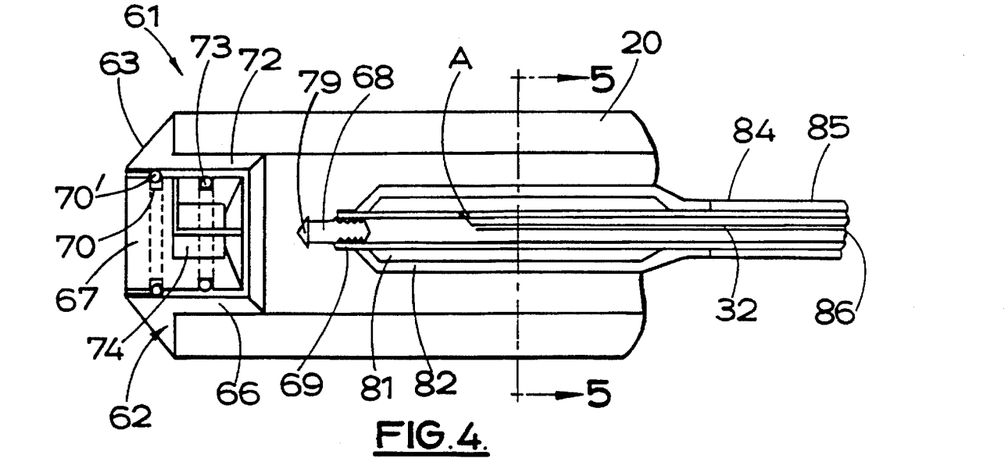
FIG. 4 is a longitudinal cross-section of one end of a plastics liner fitted with a termination assembly, the free end of the flexible means being shown unattached to the plug.

With reference to FIGS. 4 and 5, a termination assembly 61 comprises a tubular terminator 62 having a frusto-conical 'streamline' portion 63 covering the extremity 64 of the liner 20, and an integral spigot portion 66 adapted to be a tight fit within the liner 20. A plug 67 is adapted to have a snap-engagement with a screw 68 in the extremity of a polyamide tube 69 which constitutes an end portion of a flexible elongate means for withdrawing the plug 67 at the appropriate stage through the bore of the liner 20.

Plug 67 is formed with a first external annular recess 70 in which is seated a replaceable O-ring seal $70^1$.

The bore of terminator 62 is slightly reduced at its free end to prevent the plug 67 from passing outwardly of the terminator 62, ie to the left of the position shown in FIG. 4.

The rear half of plug 67 is split to define a semicircular latch block 72 which is held captive to the main part of plug 67 by a circlip 73 located in a second annular recess in plug 67.

The rear end of plug 67 has an axial blind bore 74, and an internal lip 75 at the entrance to bore 74 provides a snap connection with a frusto-conical head 79 on screw 68.

The capacitative sensor comprises a length of tubular wire mesh forming an electrode 81 which is coaxially carried by the tube 69 and is encased by a shrink sleeving 82. The electrode 81 and sleeving 82 extend axially adjacent to the spigot portion 66, which is of an electrically conductive material. This has the effect of substantially increasing the sensitivity of the capacitative sensor, formed by the electrode 81 in conjunction with the metal pipe 1 being lined, to the flow of sealant material (along the annular gap between the sleeve 20 and the pipe) as the sealant closely approaches the position of the spigot 66. The sleeving 82 protects the electrode 81 against abrasion and increases the effective tensile strength of tube 69.

The provision of plug 67 during insertion of the liner 20 into a pipe prevents debris from entering the liner.

The tube 69 may be filled with a flexible sealant to increase the rigidity and strength of the tube, and the tube 69 is adhesively secured within the end 84 of a further polyamide tube 85 which constitutes a main portion of the flexible elongate means.

The inner core of a coaxial cable 86 extends through a hole A in the tube 69 to connect with the mesh 81.

Having now described the termination assembly 61 and capacitative sensor, the description of the liner insertion procedure will now be continued.

The terminator 62 is fitted to one end of the cut length of liner 20, following the insertion of a first plug 67 into the terminator 62, whereby the terminator 62 containing first plug 67 seals that end of liner 20. The liner 20 is then pressure tested at 100 mb for five minutes. No pressure drop is acceptable.

On operating the pushing machine, the liner 20 is inserted to a datum position which is when the terminator 62 is arrested by the main 3 or by the connection 2 with the main.

Figure 9:
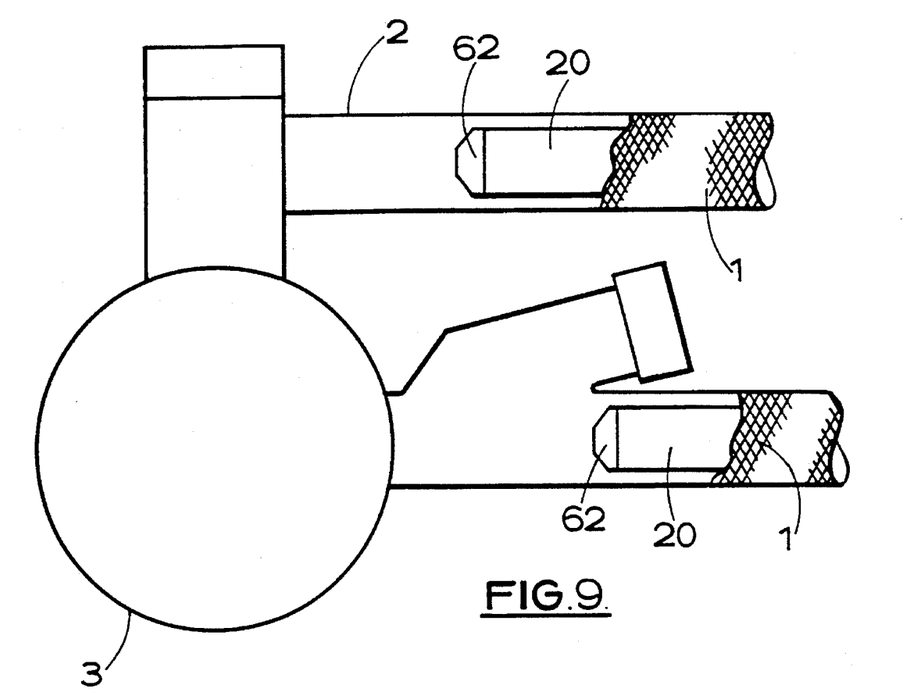
FIGS. 9 and 10 show the final positions of the terminator for different connection configurations between the service and the main.
Figure 10:
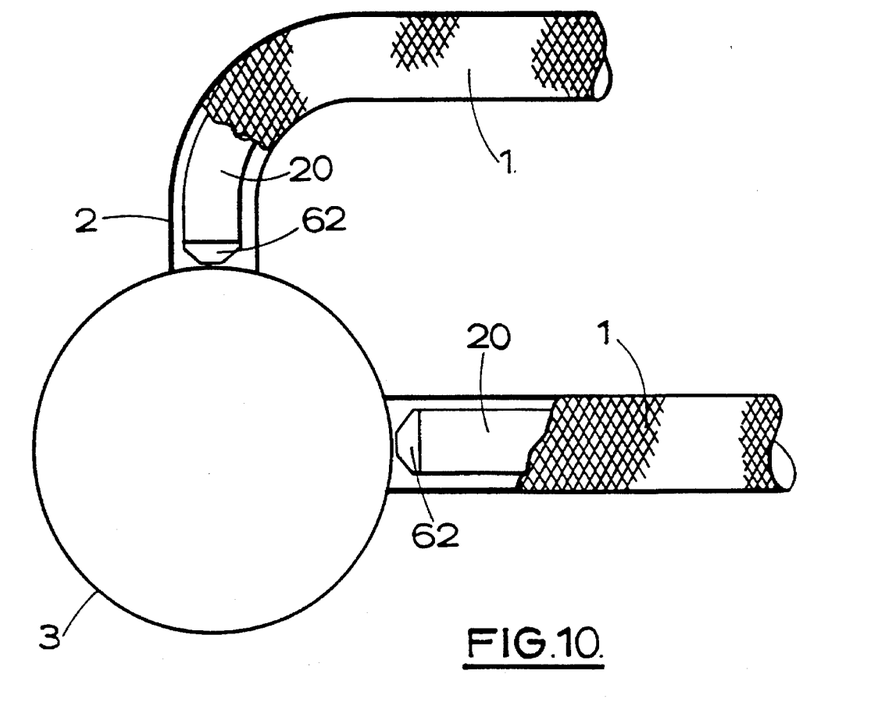

If the connection 2 between service 1 and the main 3 is a direct connection, as shown in FIG. 10, then the liner 20 will be arrested when the terminator 62 has traversed the interior of the main 3. Alternatively, if the connection 2 is a TEE or branch connection as shown in FIG. 9, then the terminator 62 will be arrested by that connection and will not enter the main 3. The nature of the connection 2 can be sensed by utilising the capacitative sensor 61 to measure whether or not the terminator 62 has entered the main 3.

A second plug, which is conveniently identical to first plug 67 shown in FIG. 4, is snap-fitted to the screw 68, and tube 69 with accompanying capacitative sensor 81 and second plug are inserted into the free end of the liner 20 until the tube 69 is arrested by the abutment of the second plug with the first plug 67. The value of the capacitor formed by the sensor mesh 81 with the service 1 is then monitored as the tube 69 is withdrawn by about 1 m.

That is, the capacitance is monitored as the second plug is retracted gradually from the first plug 67.

The capacitance is measured by applying a fixed frequency signal to the capacitor via the coaxial cable 86, the outer conductor of which is driven in sympathy with the inner by means of a unity gain buffer amplifier. This cancels the shunting effect of the stray cable to service pipe capacitance and so allows the current to the sensor capacitor to be monitored.

The measured value of the sensor capacitance will increase as the tube 69 is withdrawn if the terminator 62 is located within the main 3, but if, on the other hand, the terminator 62 had not entered the main 3, the capacitance will stay substantially constant as the tube 69 is withdrawn by 1 m.

If it is ascertained by such measurements that the terminator 62 is in the main 3, then the liner 20 is withdrawn by the exact length corresponding to the diameter of main 3, to the position shown in FIG. 10. If it is ascertained that the terminator 62 has not entered the main 3, because the connection 2 is as in FIG. 9, the liner 20 is withdrawn by 50 mm to provide a sufficient clearance between the terminator 62 and the connection 2.

The tube 69 and second plug are then removed completely from the liner 20. The pusher 15 and gland 13 are then detached.

The liner 20 can then be cut to the correct length and upper portion 43 of the service head adaptor is fitted.

A new meter cock 50 is then installed on the top of portion 43, and the other components shown in FIG. 8 are then attached, namely a gas seal unit 89 which is part of the meter cock exchange kit, a sealant injection gun 90, and an earthing clamp 91 with pointed screw 92.

The gas seal unit 89 is provided with a test nipple 93.

Clamp 91 is connected by strap 94 to a control box 95 for monitoring the capacitance of the capacitative sensor, the coaxial lead 86 being plugged into a socket 96.

The tube 69 without a plug attached is then inserted into the liner 20 through the gas seal unit 89 and is pushed through the liner as far as possible until the head 79 of screw 68 is arrested by the plug 67 located in terminator 62. It is important to ensure that the head 79 has engaged with the plug 67 because this engagement determines the precise axial position of the capacitance sensor 81 relative to the free end 64 of liner 20. This engagement can be tested by withdrawing the tube 69 by 50 mm and monitoring gas flow through nipple 93. If the head 79 has snap-engaged with the plug 67, then the plug will be withdrawn from terminator 62 thereby allowing some gas flow past O-ring $70^1$. The tube 69 is then fully re-inserted to reposition the plug 67 in terminator 62.

Sealant is then injected by gun 90 into the annular space between the liner 20 and pipe 1 through injection port 46, and the value of the capacitance between the electrode 81 and the pipe 1 is monitored, as before, by the unit 95. A significant change in the measured capacitance is produced when the sealant closely approaches the region of the electrode 81, because the sealant provides a dielectric interposed between the plates of the capacitor. An indicator buzzer is activated by a capacitor monitor circuit in response to a preset threshold level being reached, and the operator ceases to operate the gun 90. Thus it is ensured that the sealant is not injected into the main 3, but stops short of the terminator 62.

The tube 69 is then withdrawn, bringing with it the plug 67, which is withdrawn through the meter cock 50 and seal unit 89. The liner 20 is then purged, and the meter cock 50 is turned off.

The service is now complete. A label is attached to the riser "Warning, this service has been live-inserted".

This will inform operatives that there is only a 500 mm tail of unsealed pipe 20 at the connected end.

Services vary in size and length and method of connection to the main. Our system has the advantage that by sensing the sealant when it has reached the correct position, all of the annular space 31 is filled. Even if services are unsound, the sealant will automatically continue to be pumped until all the gap is filled.

As there is usually no excavation, service renewal could possibly be undertaken by personnel restricted to light duties or possibly to a one-man operation.

During the process of service renewal, an 'air mover' (TM) device or similar coanda effect device, not shown, can be attached to the existing riser so as to remove odors and small volumes of venting gas to outside the property.

A suitable sealant for filling the annular space is a one-part methacrylate with a formulation to form a low base viscosity yet made thixotropic by the addition of thickening agents. The sealant used is typically of a one part anaerobic thixotropic gel type and the insertion nozzle consists of a disposable combined catalyst and mixer which triggers the gel to cure it.

A preferred sealant is ANNERSEAL (TM) supplied by Chemence Limited of Princewood Road, Corby, Northamptonshire NN17 2XD. ANNERSEAL is a mixture of methacrylates, cumene hydroperoxide initiator and metal catalyst with trace additives.

Other sealants for the annular gap can also be used, for example polyurethanes, epoxies, acrylics, cyanoacrylates, silicones, polyesters, polysulphides, latices or cement or clay based sealants.

We claim:

1. A method of lining a pipe (1), which has an underground connection with a further pipe (2), the method comprising:

inserting a tubular liner (20) into the pipe from an end (5) opposite to the underground connection (2) such that the liner extends adjacent to the connection;

injecting a sealant between the liner and the pipe and between the liner and the underground connection, so as to close-off the annular space defined between the liner and the pipe in a region adjacent to said underground connection, the sealant being introduced into the pipe remote from the underground connection;

positioning a detector in the pipe and adjacent to the underground connection; and detecting when the sealant between the liner and the pipe has reached the region adjacent to the underground connection.

2. The method of claim 1 wherein the sealant is injected in a flowable condition into the annular space from adjacent the opposite end (5) of the pipe, following insertion of the liner (20) into the pipe (1).

3. The method of claim 1 further comprising terminating the injection of sealant into the annular space in response to detecting the sealant reaching the region adjacent to the underground connection.

4. The method of claim 3 wherein in the positioning of the detector, the detector is arranged in the liner adjacent the underground connection; and further comprising the detector producing a signal when the sealant closely approaches the detector.

5. The method of claim 4 wherein the signal produced by the detector is an electrical signal.

6. The method of claim 5 wherein the detector is a capacitive sensor, wherein the pipe being lined is metal to form one electrode of the capacitive sensor, and wherein the other electrode is an insert (81) which is arranged to be temporarily located within the liner, at a location spaced a distance along the pipe from the underground end of the pipe.

7. The method according to claim 3, in which the detector is carried by a flexible elongate carrier (69) which is inserted into the liner, and is withdrawn from the liner after insertion of the sealant.

8. The method according to claim 6, further comprising fitting the liner with a termination assembly comprising a tubular terminator (62) having a generally streamlined portion (63) adapted to abut with that end (64) of the liner which is inserted into a pipe to be lined, and a spigot portion (66) adapted to be a firm fit within that end of the liner, the streamlined portion substantially covering the cut extremity (64) of that end of the liner, and a plug (67) which is adapted to seal the bore of the terminator and to be retractable from the terminator through the bore of the liner.

9. The method according to claim 8, further comprising mounting said capacitive electrode insert (81) on an elongate flexible means (69) adjacent a connector (68) adapted to connect said flexible means (69) and the plug (67).

10. The method according to claim 4 in which the detector is carried by a flexible elongate carrier (69) which is inserted into the liner, and is withdrawn from the liner after insertion of the sealant.

11. The method according to claim 5 in which the detector is carried by a flexible elongate carrier (69) which is inserted into the liner, and is withdrawn from the liner after insertion of the sealant.

12. A pipe which has been lined by the method according to claim 1.

13. A method of lining a pipe (1) which has an underground connection with a further pipe (3), the method comprising: inserting a tubular liner (20) into the pipe (1) from a free end (5) of the pipe (5) opposite to the underground connection (2) such that the liner extends adjacent to the underground connection, positioning the liner axially of the pipe (1) relative to the connection (2), arranging a capacitive sensor (81) with the liner adjacent to an underground end of the liner which has been pushed fully into the pipe (1), and retracting the sensor by a predetermined amount whilst monitoring the capacitance between the sensor (81) and the pipe (1) being lined, using the monitored capacitance characteristic to determine the type of connection (2) between the pipe (1) and the further pipe (3), and then repositioning the liner (20) axially in the pipe (1) according to the detected type of connection.

* * * * *